United States Patent [19]

Meyer et al.

[11] Patent Number: 4,663,357
[45] Date of Patent: May 5, 1987

[54] HIGHER MOLECULAR WEIGHT THERMOPLASTICS HAVING MULTIMODAL MOLECULAR WEIGHT DISTRIBUTION

[75] Inventors: Bernard H. Meyer, Newtown Square; Adolph V. DiGiulio, Wayne; Joseph C. Kinslow; Dennis M. Hajnik, both of West Chester, all of Pa.

[73] Assignee: Atlantic Richfield Company, Los Angeles, Calif.

[21] Appl. No.: 861,796

[22] Filed: May 12, 1986

[51] Int. Cl.$^4$ .............................................. C08J 9/18
[52] U.S. Cl. ...................................... 521/59; 521/56; 521/57; 521/60; 521/139; 525/242; 525/243; 525/263; 525/301; 525/309
[58] Field of Search ....................... 521/56, 57, 59, 60, 521/139; 525/301, 263, 309, 242, 243

[56] References Cited

U.S. PATENT DOCUMENTS

| | | | |
|---|---|---|---|
| 2,744,291 | 5/1956 | Stastny et al. | 521/56 |
| 3,743,611 | 7/1973 | Muroi et al. | 521/60 |
| 4,368,218 | 1/1983 | Senda et al. | 521/60 |
| 4,433,029 | 2/1984 | Senda et al. | 521/60 |

*Primary Examiner*—Morton Foelak
*Attorney, Agent, or Firm*—Lewis J. Young

[57] ABSTRACT

Thermoplastic particles are suspended in water or other suspending fluids with a suspending aid(s) to prevent agglomeration of the beads, pellets or particles. To this suspension is added monomer(s) containing a multifunctional initiator(s). The monomer and initiator(s) are pre-emulsified in water or other fluid(s) before the addition in order to improve distribution of the monomer(s) and initiator(s) in or on the particles. After or during the addition(s), the suspension temperature is raised to cause polymerization. The procedures may be repeated to increase the coating or penetrated polymer content. New compositions of matter are made by this technique wherein the new compositions are plastic resins either coated or penetrated, or both, with a thermoplastic(s) of very high molecular weight not obtainable by present, commercial polymerization techniques. The compositions are superior to the feed resins because of the enhancement of physical properties brought about by the high molecular weights phase(s). This enhancement would be extended to foams made from these new resins.

8 Claims, No Drawings

HIGHER MOLECULAR WEIGHT THERMOPLASTICS HAVING MULTIMODAL MOLECULAR WEIGHT DISTRIBUTION

BACKGROUND OF THE INVENTION

The present invention relates to a process for producing thermoplastic-resin particles comprising a styrenic polymer base and a high molecular weight polymer or copolymer polymerized either throughout the base polymer particle or primarily near or at the surface of said base polymer particle. The molecular weight of a thermoplastic will generally dictate the resultant physical properties of the thermoplastic. As a rule, the higher the molecular weight, the higher mechanical properties (tensile, flexural, compressive strength) will be. However, processing of very high molecular weight thermoplastics is quite difficult. For example, the molecular weight (Mw) of commercial polystyrene is 200,000–350,000. This limits the physical properties but ensures good processibility. Bead foams of polystyrene also have Mw's in this range in order to obtain good expandability. However, this again restricts maximizing physical properties.

BRIEF SUMMARY OF THE INVENTION

We have now found that thermoplastics of typical commercial molecular weight can be upgraded significantly in molecular weight by adding a second or third polymer phase of super high molecular weight to give bimodal (or possibly multimodal) molecular weight distributions. The lower molecular weight portion of the thermoplastic imparts good processibility, while the higher molecular weight portion imparts improved mechanical properties.

DETAILED DESCRIPTION OF THE INVENTION

The process is a method of improving the mechanical properties of thermoplastic polymers comprising:

(a) suspending styrenic polymer particles in a suitable suspension medium with the aid of a suitable suspending agent system;

(b) forming an emulsion of monomers capable of swelling said styrenic polymer particles, a multi-functional peroxide having a 10-hour half-life temperature of 40° C. to 140° C., and a mono-functional peroxide having a 10-hour half-life temperature of 95° C. to 110° C.;

(c) adding said emulsion to said suspension to allow the monomers and peroxides to be absorbed into the polymer particles;

(d) heating said suspension to a temperature of 80°–135° C. and maintaining the suspension of said temperature for 0.10 to 6 hours to polymerize said monomers to a high molecular weight polymer or copolymer;

(e) heating said suspension at a temperature of 115° C. to about 135° C. to substantially complete the polymerization of the monomers to form the final particles having a bimodal or multimodal molecular weight distribution; and (f) cooling the suspension to room temperature and separating the final polymer particles from the suspension medium.

Steps (b), (c), and (d) may be repeated as often as desired to build up the proportion of high molecular weight polymer or copolymer in the final product. To effect this modification, after the initial step (d), the suspension is cooled to the desired temperature of addition; the emulsion added and the suspension again heated to polymerize the added monomers. A minimum of about 10% by weight of monomers are required to give a significant increase in mechanical properties to the base styrenic polymer. There is no limit to the number of emulsions which can be added. If different polymerization conditions are used or if individual emulsions contain different concentrations of monomers or peroxides, the high molecular weight portion will have a different Mw and the resultant MWD may well be multi-modal instead of bimodal.

After step (d) the suspension can be cooled to room temperature and the polymer particles separated from the aqueous medium. The residual monomers are then vacuum stripped at a temperature of 115° C. to about 135° C. to recover the final particles having abimodal or multimodal molecular weight distribution.

The term "styrenic" as used herein is intended to include styrene, alpha-methylstyrene, nuclear-methylstyrene, para-t-butylstyrene, monochlorostyrene and dichlorostyrene, as well as mixtures thereof. The term "styrenic polymer particles" is intended to include particles of homopolymers of styrenic monomers, copolymers of styrenic monomers and other monomers copolymerizable therewith, rubber-modified polymers or copolymers of styrenic monomers, and blends of polymers or copolymers of styrenic monomers and other compatible thermoplastic resins.

Particles, as used herein, may be beads, pellets, granules, or comminuted pieces. Preferred examples of monomers copolymerizable with styrenic monomers are methyl acrylate, methyl methacrylate, maleic anhydride and acrylonitrile. Many other examples will be obvious to one skilled in the art of styrene polymerization. Preferred compatible thermplastic resins suitable for the blends with polymers or copolymers of styrenic monomers are polycarbonates and polyphenylene oxides.

The initial styrenic polymer particles are formed into a suspension in an aqueous medium by dispersing the particles in water, containing suitable suspending agent system. One such system may be a finely divided, difficultly water-soluble, inorganic phosphate suspending agent such as those described in Grim U.S. Pat. No. 2,673,194, and include tricalcium phosphate, hydroxyapatite, magnesium phosphate, and the like. Modifiers, such as sodium dodecylbenzene sulfonate can also be added as per the Grim Patent. The amount of such suspension agent added is about 0.5–4.0 percent by weight of the final product, with about 0.7–3 percent by weight preferred. Another such system is a polyvinyl alcohol suspending agent, such as is sold under the trademark "Vinol 540", in a amount of about 0.07–0.30 percent by weight, with a preferred amount of about 0.10 percent, based on the final product weight. Other organic suspending agent systems include hydroxyethyl cellulose and polyvinyl pyrrolidone. Equally useful systems employ combinations of inorganic and organic suspending agents, for example tricalcium phosphate and polyvinyl alcohol. Mixtures of these systems can also be used. The initial styrenic polymer particles may also have additional additives, such as internal fast-cool agents, pigments and dyes, stabilizers, anti-lump agents, self-extinguishing agents, plasticizers, and polymeric additives, such as minor amounts (0.05–0.50 wt. %) of polyethylene, polypropylene, and in particular, polywaxes such as low molecular weight (Mn 650–1500), narrow MWD, crystalline (densities 0.93–0.96) polyethylenes and similar molecular weight Fisher-Tropsch waxes.

Although water is the preferred suspension medium, other mediums, such as glycerol, would be suitable.

The "monomers capable of swelling" said styrenic polymer particles may be monoethylenically unsaturated, for example, any of the styrenic monomers, alkyl acrylates and methacrylates, unsaturated nitriles, acrylic acid, methacrylic acid, and mixtures thereof. The only criteria for these monomers is that their emulsion must be absorbed by the styrenic polymer particles.

The process of adding emulsified monomers and catalyst to a suspension of particles is described in U.S. Pat. No. 4,333,969, which is hereby incorporated in its entirety into the present application. Depending on the base polymer and the particular monomer or comonomers added, the monomer(s) may be completely absorbed throughout the base polymer or may be concentrated near or at the surface of the base polymer particles.

Suitable emulsifiers may be the sodium alkylbenzene sulfonates, such as dodecylbenzene sulfonate, as well as the various nonionic surfactants comprising polyoxyethylene mono-ethers and mono-esters, such as polyoxyethylene sorbitan monolaurate, wherein the polyoxyethylene portion may have from 20 to 50 moles of ethylene oxide. Examples of the mono-ethers are the ethylene oxide condensates of octyl or nonylphenol.

The term "multi-functional peroxides" as used herein means peroxides having at least two —$O_2$— groups capable of producing radicals. Suitable multi-functional free-radical initiators are those peroxides having a 10-hour half-life temperature from 40° to 140° C. These include 2,5-dimethyl-2,5-bis(neooctanoylperoxy)hexane (42°)
2,5-dimethyl-2,5-bis(neopentanoylperoxy)hexane (51°)
2,5-dimethyl-2,5-bis(2-ethylhexanoylperoxy)hexane (66°)
2,5-dimethyl-2,5-bis(2-methylpentanoylperoxy)hexane (68°)
2,5-dimethyl-2,5-bis(2-ethylbutyroylperoxy)hexane (69°)
2,5-dimethyl-2,5-bis(2-methylpropionylperoxy)hexane (72°)
2,5-dimethyl-2,5-bis(pentanoylperoxy)hexane (91°)
2,5-dimethyl-2,5-bis(octanoylperoxy)hexane (92°)
2,5-dimethyl- 2,5-bis(decanoylperoxy)hexane (96°)
2,5-dimethyl-2,5-bis(benzoylperoxy)hexane (100°)
2,5-dimethyl-2,5-bis(tert-butylperoxy)hexane (119°)
2,5-dimethyl-2,5-bis(neopentanoxylperoxy)hexyne-3 (50°)
2,5-dimethyl-2,5-bis(2-ethylhexanoylperoxy)hexyne-3 (64°)
2,5-dimethyl-2,5-bis(2-ethylbutyroylperoxy)hexyne-3 (66°)
2,5-dimethyl-2,5-bis(2-methylpentanoylperoxy)hexyne-3 (68°)
2,5-dimethyl-2,5-bis(2-methylpropionylperoxy)hexyne-3 (71°)
2,5-dimethyl-2,5-bis(pentanoylperoxy)hexyne-3 (95°)
2,5-dimethyl-2,5-bis(octanoylperoxy)hexyne-3 (95°)
2,5-dimethyl-2,5-bis(decanoylperoxy)hexyne-3 (95°)
2,5-dimethyl-2,5-bis(tert-butylperoxy)hexyne-3 (128°)
2,4,7,9-tetramethyl-4.7-bis(2-ethylhexanoylperoxy)hexyne-3 (62°)
2,7-dimethyl-2,7-bis(neooctanoylperoxy)octane (42°)
2,7-dimethyl-2,7-bis(neopentanoylperoxy)octane (50°)
2,7-dimethyl-2,7-bis(2-ethylhexanoylperoxy)octane (64°)
2,7-dimethyl-2,7-bis(2-ethylbutyroylperoxy)octane (66°)
2,7-dimethyl-2,7-bis(2-methylpentanoylperoxy)octane (68°)
2,7-dimethyl-2,7-bis(2-methylpropionylperoxy)octane (71°)
2,7-dimethyl-2,7-bis(pentanoylperoxy)octane (90°)
2,7-dimethyl-2,7-bis(octanoylperoxy)octane (91°)
2,7-dimethyl-2,7-bis(decanoylperoxy)octane (94°)
1,1-bis(tert-butylperoxy)-3,3,5-trimethylcyclohexane (90°)
Di-tert-butyldiperoxy carbonate (91°)
1,1-bis(tert-butylperoxy)cyclohexane (93°)
2,2-di(tert-octylperoxy)propane (94°)
2,2-bis(tert-butylperoxy)-4-methylpentane (101°)
Di-tert-butyldiperoxyphthalate (105°)
2,2-bis(tert-butylperoxy)butane (107°)
n-butyl 4,4-bis(tert-butylperoxy)valerate (108°)
2,4,6-tris(tert-butylperoxy)-1,3,5-triazine (112°)
1,3,5-tris($\alpha$-tert-butylperoxyisopropyl)benzene (112°)
ethyl 3,3-bis(tert-butylperoxy)butyrate (115°)
1,3-bis($\alpha$-tert-butylperoxyisopropyl)benzene (116°)
tris(tert-butylperoxy)vinyl silane (121°)
Di[1,3-dimethyl-3-(tert-butylperoxy)butyl]carbonate (123°)
Bis(tert-butylperoxy)diphenyl silane (136°)

These initators may be used alone or in mixtures thereof. The multi-functional peroxide is used to polymerize the coating monomers to extremely high molecular weight polymers. These high molecular weight polymers, when measured along with the lower molecular weight base polymers, yield a multi-modal polymer having physical properties greatly improved over those of the base polymers.

The particles are made expandable by the usual impregnation techniques using blowing agents which are gases or produce gases on heating, such as aliphatic hydrocarbons containing from 4 to 6 carbon atoms in the molecule, such as butane, pentane, cyclopentane, hexane, cyclohexane and the halogenated hydrocarbons which boil at a temperature below the softening point of the polymer. Mixtures of these agents may also be used. The blowing agents are incorporated by conventional processes, such as that described in U.S. Pat. No. 2,983,692.

The present invention is further illustrated in the following examples, wherein parts and percentages are by weight unless otherwise indicated.

EXAMPLE I

To a 2 l. resin kettle having an agitator, reflux condenser, combination baffle/thermometer wells and a monomer feed port was added 400 g. distilled water, 12 g. tricalcium phosphate, and 440 g. polystyrene beads of through 35 mesh and on 50 mesh bead size (U.S. Standard Sieve). The weight average molecular weight (Mw) of the polystyrene was 270,000 with an MWD of 2.4. The resulting suspension was heated, with stirring at 400 rpm, to 70° C.

An emulsion was formed by first dissolving 0.24 g. of 2,5-dimethyl-2,5-bis(2-ethylhexanoylperoxy) hexane and 0.064 g. of tert-butyl perbenzoate in 120 g. of styrene and then homogenizing this solution with 172 g. distilled water and 0.12 g. of sodium dodecylbenzene sulfonate.

The emulsion was added dropwise to the reactor containing the suspension of polystyrene beads over a period of 30 minutes. The suspension was then heated to 90° C. over approximately 30 minutes and maintained at 90° C. for 1.5 hours. The reactor was then cooled to 70° C. and the polymer beads sampled. The beads at this point had an $M_w$ of 587,400 with an MWD of 4.04. Gel Permeation Chromatography (GPC) shows a bimodal distribution of molecular weights indicating the original 270,000 $M_w$ polystyrene has a higher $M_w$ component polymerized thereon or therein to give an MWD of 4.04. The 270,000 $M_w$ material contributes to processability, while the higher $M_w$ material contributes to improved mechanical properties.

To add a second coating of high molecular weight polystyrene, a second emulsion of catalyst, styrene and water was formed as before and this emulsion was added to the reactor at 70° C. over approximately 30 minutes. The suspension was then heated to 90° C. over 30 minutes and maintained at 90° C. for 1.5 hours. The reactor was then cooled to room temperature and the polymer beads sampled. The beads at this point had a $M_w$ of 802,200 with an MWD of 5.28. The GPC curve shows a bimodal distribution of molecular weights.

The reactor contents were transferred in approximately 200 g. portions to 12-ounce bottles and heated at 135° C. for 1 hour. The bottles were then cooled to room temperature, opened, and the contents acidified to pH 1.0 with hydrochloric acid. The beads were separated and water-washed on a 100 mesh sieve. The final beads were found by GPC measurement to have an $M_w$ of 539,000 with an MWD of 4.48. From this it can be seen that some degradation of molecular weight occurred during finishing off of residual monomer but a bimodal MWD was still obtained.

EXAMPLE II

The procedure of Example I was repeated using the same polystyrene beads, the same emulsions added twice and the same finishing step. In addition, a run was made again repeating the procedure except the 0.24 g. of 2,5-dimethyl-2,5-bis(2-ethylhexanoylperoxy)hexane (USP-245) was replaced with 0.24 g. of benzoyl peroxide (BPO) in the emulsions. The results are tabulated in Table I.

TABLE I

| Peroxide | $M_w \times 10^{-3}$ | $M_w/M_n$ | Emulsion Added |
|---|---|---|---|
| None | 270 | 2.40 | 0 |
| BPO | 349 | 2.94 | 1st |
| BPO | 372 | 2.98 | 2nd |
| BPO | 273 | 2.62 | Finish @ 135° C. |
| USP-245 | 658 | 4.56 | 1st |
| USP-245 | 983 | 5.95 | 2nd |
| USP-245 | 536 | 4.13 | Finish @ 135° C. |

It was noted that if the samples were finished by vacuum stripping the residual styrene monomer at 135° for 1.5-3.0 hours, the final $M_w$ did not degrade. The tabulated samples, however, were finished by bottle polymerization for 1 hour at 135° C. and as shown, were degraded.

As can be seen, use of the monoperoxide, BPO, in the emulsions gave a slight increase in $M_w$, but GPC curves indicate the products were still monomodal in distribution. The samples prepared with USP-245 diperoxide had a much higher molecular weight fraction in addition to the initial molecular weight fraction and was thus bimodal.

EXAMPLE III

To indicate the scope of the invention, a series of reactor runs were made using the method of Example I with the following formulations:

| Starting Resin | Monomers Added | (a) $M_w \times 10^{-3}$ | $M_w/M_n$ |
|---|---|---|---|
| Polystyrene | tert-butyl-styrene | 527 | 4.25 |
| Styrene-Maleic Anhydride Copolymer (92/8 wt. %) | styrene/methyl-methacrylate (50/50 wt. %) | — | — |
| Styrene-Maleic Anhydride Copolymer/Polycarbonate (50/50 blend) | styrene/methyl-methacrylate (50/50 wt. %) | — | — |
| High Impact Polystyrene* | styrene | 393 | 2.95 |
| High Impact Polystyrene* | 8% Stereon 720 in styrene** | — | — |
| Impact Polystyrene/ Polyphenylene Oxide (50/50 Blend) | styrene | — | — |

*Dylene 601 sold by ARCO Chemical Co.
**Stereon 720 is a 70/30 butadiene/styrene tapered block rubber sold by Firestone Tire & Rubber Co.
(a) molecular weights determined on GPC using polystyrene calibration.

In all cases the GPC curves showed a bimodal or multimodal molecular weight distribution, even though accurate molecular weights could not be calculated from the existing polystyrene calibration curves.

EXAMPLE IV

Several samples of bimodal molecular weight distribution materials prepared by the method of Example I were impregnated with n-pentane and molded on a cup machine made by Master Machine and Tool Company using an 8F mold to produce 8 oz. smooth wall cups at a steam header pressure of 80 psi and a back pressure of 44 psi using a 3-second cook time. The rim deflection of the cups in mils was measured on a Chatillion LTCM Tension and Compression Tester, using a deflection speed of 0.35 inch/minute at a force of 200 grams. The results are shown in Table II.

TABLE II

| Prepuff Density, pcf. | $M_w \times 10^{-3}$ | $M_w/M_n$ | % Improvement Over PS Controls* % Deflection |
|---|---|---|---|
| 3.0 | 270 | 2.4 | Control |
| 3.5 | 536 | 4.13 | 24.5 |
| 3.6 | 668 | 5.14 | 18.0 |
| 2.8 | 538 | 3.93 | 13.7 |
| 3.7 | 666 | 4.14 | 18.0 |
| 4.1 | 584 | 2.92 | 8.7 |
| 3.5 | 654 | 4.45 | 14.7 |
| 3.9 | 582 | 4.27 | 14.0 |
| 5.1 | 776 | 4.67 | 6.5 |
| 3.6 | 498 | 3.85 | 7.2 |
| 3.9 | 568 | 3.73 | 9.7 |

*Polystyrene control calibration curve was obtained at 80/44 psig at minimum overall cycles.

In all cases, the stiffness, as measured by rim deflection, was improved over monomodal polystyrene when bi- or polymodal polymers were substituted in the cups.

We claim:
1. A method of improving the mechanical properties of thermoplastic polymers comprising:
   (a) suspending styrene polymer particles in a suitable suspension medium with the aid of a suitable suspending agent system;

(b) forming an emulsion of monoethylenically unsaturated monomer or monomers capable of swelling said styrene polymer particles, a multi-functional peroxide having a 10-hour half-life temperature of 40° C. to 140° C., with or without a mono-functional peroxide having a 10-hour half-life temperature of 95° C. to 110° C.;

(c) adding said emulsion to said suspension to allow the monomers and peroxides to be absorbed into the polymer particles;

(d) heating said suspension to a temperature of 80°–135° C. and maintaining the suspension at said temperature for 0.10 to 6 hours to polymerize said monomers to a high molecular weight polymer or copolymer;

(e) heating said suspension at a temperature of 115° C. to about 135° C. to substantially complete the polymerization of the monomers to form the final particles having a bimodal or multimodal molecular weight distribution; and (f) cooling the suspension to room temperature and separating the final polymer particles from the suspension medium.

2. The method of claim 1 wherein before step (e) said suspension may be cooled to 25°–75° C., and steps (b), (c), and (d) may be repeated as often as desired to effect multiple absorption of the monomers and catalysts to increase the percentage of high molecular weight polymer or copolymer in the final styrene polymer particles.

3. The method of claim 1 wherein said styrene polymer is selected from the group consisting of polymers of styrene monomers, copolymers of styrenic monomers and methylmethacrylate, maleic anhydride, and acrylonitrile, rubber-modified polymers of styrene monomers or copolymers, and blends of styrene polymers or copolymers and polyphenylene oxide or polycarbonates.

4. The method of claim 1 wherein said monomers capable of swelling said styrene polymer particles are selected from the group consisting of styrene monomers, alkylacrylate and methacrylates, unsaturated nitriles, acrylic acid, methacrylic acid, and mixtures thereof.

5. The method of claim 3 wherein said styrene monomers are selected from the group consisting of styrene, alpha-methylstyrene, nuclear methylstyrene, para-tert-butylstyrene, monochlorostyrene and dichlorostyrene and mixtures of these.

6. The method of claim 1 wherein said suitable suspension medium is selected from the group consisting of water, glycerol, and mixtures thereof.

7. The method of claim 1 wherein said suitable suspending agent system is selected from the group consisting of a finely divided difficultly water-soluble inorganic phosphate alone or in combination with an anionic surfactant, polyvinyl alcohol, hydroxyethyl cellulose, polyvinylpyrrolidone, and mixtures thereof.

8. A method of improving the mechanical properties of thermoplastic polymers comprising:

(a) suspending styrene polymer particles in a suitable suspension medium with the aid of a suitable suspending agent system;

(b) forming an emulsion of monoethylenically unsaturated monomer or monomers capable of swelling said styrene polymer particles, a multi-functional peroxide having a 10-hour half-life temperature of 40° C. to 140° C., with or without a mono-functional peroxide having a 10-hour half-life temperature of 95° C. to 110° C.;

(c) adding said emulsion to said suspension to allow the monomers and peroxides to be absorbed into the polymer particles;

(d) heating said suspension to a temperature of 80°–135° C. and maintaining the suspension at said temperature for 0.10 to 6 hours to polymerize said monomers to a high molecular weight polymer or copolymer;

(e) cooling the suspension to room temperature and separating the polymer particles from the suspension medium; and (f) vacuum stripping said particles at a temperature 115° C. to about 135° C. to substantially complete the polymerization of the monomers to form the final particles having a bimodal or multimodal molecular weight distribution.

* * * * *